(12) United States Patent
Li et al.

(10) Patent No.: US 12,139,113 B2
(45) Date of Patent: Nov. 12, 2024

(54) AUTOMATIC PRESSURE REGULATING VALVE FOR MULTIPLE LEVELS OF DRIVING AUTOMATION OF COMMERCIAL VEHICLE AND CONTROL METHOD THEREOF

(71) Applicant: Wuhan University Of Technology, Wuhan (CN)

(72) Inventors: Gangyan Li, Wuhan (CN); Hanwei Bao, Wuhan (CN); Jian Hu, Wuhan (CN); Zhiqiang Gu, Wuhan (CN); Fang Yang, Wuhan (CN)

(73) Assignee: Wuhan University Of Technology, Wuhan (CN)

( * ) Notice: Subject to any disclaimer, the term of this patent is extended or adjusted under 35 U.S.C. 154(b) by 330 days.

(21) Appl. No.: 17/726,500

(22) Filed: Apr. 21, 2022

(65) Prior Publication Data

US 2023/0018533 A1   Jan. 19, 2023

Related U.S. Application Data

(63) Continuation of application No. PCT/CN2021/109032, filed on Jul. 28, 2021.

(30) Foreign Application Priority Data

Jul. 19, 2021   (CN) .......................... 202110811004.8

(51) Int. Cl.
*B60T 15/02* (2006.01)
*B60T 7/12* (2006.01)
(Continued)

(52) U.S. Cl.
CPC ................ *B60T 13/62* (2013.01); *B60T 7/12* (2013.01); *B60T 8/92* (2013.01); *B60T 13/683* (2013.01);
(Continued)

(58) Field of Classification Search
CPC .......... B60T 13/62; B60T 13/683; B60T 8/92; B60T 15/027; B60T 2270/402; G05D 16/2023; G05D 16/2024
(Continued)

(56) References Cited

U.S. PATENT DOCUMENTS 3,944,294 A    3/1976   Masuda et al.
10,054,947 B2   8/2018   Mays et al.
(Continued)

FOREIGN PATENT DOCUMENTS

CN    101312864 A    11/2008
CN    108883759 A    11/2018
(Continued)

OTHER PUBLICATIONS

Internation Search Report of PCT/CN2021/109032, Mailed Apr. 19, 2022.

*Primary Examiner* — Christopher P Schwartz
(74) *Attorney, Agent, or Firm* — True Shepherd LLC; Andrew C. Cheng (57) ABSTRACT

An automatic pressure regulating valve for multiple levels of driving automation of a commercial vehicle includes an upper valve body, a lower valve body, a piston, a main valve core assembly, a switching valve, a quick-acting intake valve, and a quick-acting exhaust valve. The switching valve, the quick-acting intake valve and the quick-acting exhaust valve are all mounted at an upper end of the upper valve body. The piston is located in a chamber formed by the upper valve body and the lower valve body to divide the chamber into an upper control chamber and a lower chamber. The main valve core assembly is mounted in the lower valve body. The automatic pressure regulating valve is applicable to a commercial vehicle allowing for multiple levels of driving automation.

5 Claims, 8 Drawing Sheets

(51) Int. Cl.
  *B60T 8/92* (2006.01)
  *B60T 13/62* (2006.01)
  *B60T 13/68* (2006.01)
  *G05D 16/20* (2006.01)
(52) U.S. Cl.
  CPC ........ *B60T 15/027* (2013.01); *G05D 16/2024* (2019.01); *G05D 16/2033* (2013.01); *B60T 2270/402* (2013.01)
(58) Field of Classification Search
  USPC ..................................... 303/14, 119.2, 119.3
  See application file for complete search history.

(56) References Cited

U.S. PATENT DOCUMENTS

| | | | |
|---|---|---|---|
| 10,654,487 | B2 | 5/2020 | Kishi et al. |
| 11,338,783 | B2* | 5/2022 | van Thiel .............. B60T 13/683 |
| 2022/0126804 | A1* | 4/2022 | Van Zanten .......... B60T 13/145 |
| 2022/0274573 | A1* | 9/2022 | Otremba ................ B60T 15/027 |
| 2023/0016714 | A1* | 1/2023 | Li ......................... B60T 13/683 |

FOREIGN PATENT DOCUMENTS

| | | | |
|---|---|---|---|
| CN | 109733364 | A | 5/2019 |
| CN | 109823331 | A | 5/2019 |
| CN | 210106460 | U | 2/2020 |
| CN | 210978304 | U | 7/2020 |
| CN | 113460015 | A | 10/2021 |

* cited by examiner

AUTOMATIC PRESSURE REGULATING VALVE FOR MULTIPLE LEVELS OF DRIVING AUTOMATION OF COMMERCIAL VEHICLE AND CONTROL METHOD THEREOF

CROSS-REFERENCE TO RELATED APPLICATIONS

This application is a continuation of International Patent Application No. PCT/CN2021/109032 with a filing date of Jul. 28, 2021, designating the United States, and further claims priority to Chinese Patent Application No. 202110811004.8 with a filing date of Jul. 19, 2021. The content of the aforementioned applications, including any intervening amendments thereto, are incorporated herein by reference.

TECHNICAL FIELD

The present disclosure relates to the technical field of automobile manufacturing, and in particular, to an automatic pressure regulating valve for an electro-pneumatic braking system of a vehicle and a control method thereof that can realize quick, accurate, independent and real-time regulation of the pressure of a brake chamber and also can guarantee safe braking of the vehicle by manually controlled braking in case of system power failure and the like.

BACKGROUND ART

As defined by the society of automotive engineers (SAE), the levels of driving automation of intelligent vehicles can be divided into driver assistance (Level 1, L1 for short), partial driving automation (L2), conditional driving automation (L3), high driving automation (L4), and full driving automation (L5). For the driver assistance level, some countries and regions have strict regulations on active safety and advanced driver assistance system (ADAS). The development of the ADAS for commercial vehicles is also accelerating the intellectualization and industrialization of commercial vehicles.

An electro-pneumatic braking system of a commercial vehicle is a novel vehicle braking system proposed to realize aided driving and automatic driving of vehicles and comprehensively guarantee the safety, stability and comfort of vehicle braking with the development of the vehicle automation technology, which can realize intelligent braking as required by vehicle driving requirements in addition to the complete functions of a traditional air braking system. The core functional of the system is to automatically regulate the braking pressure as desired by vehicle driving. As the core pressure regulating element of the electro-pneumatic braking system of the commercial vehicle, an automatic pressure regulating valve is a basic actuator for realizing quick, accurate and real-time regulation of the braking pressure and carrying out intelligent vehicle driving, which can meet the requirements on the safety, stability and comfort of vehicle braking.

In an air braking system, the regulation of the pressure of a brake chamber is mainly realized by using a pedal valve to control an anti-lock braking system (ABS) valve, a relay valve and the like. However, such a type of pressure regulating valves has the problems of low pressure regulating accuracy, insufficient braking pressure, large fluctuation, great pressure response time delay and the like, and thus cannot meet the requirements of aided driving and automatic driving. Furthermore, the electro-pneumatic braking system is still developing. There are a few studies on automatic pressure regulating valve oriented to intelligent braking.

Chinese invention patent application No. 201910082462.5 discloses an automatic pressure regulating valve for an electro-pneumatic braking system of a vehicle and a control method thereof. This automatic pressure regulating valve includes a one-way valve connected to an manually controlled port, with the one-way valve and quick-acting intake and exhaust valves all connected to the control chamber of a relay valve. This automatic pressure regulating valve is mainly applied to an autonomous vehicle. Limited by the non-return characteristic of the one-way valve, this automatic pressure regulating valve can only allow a driver to make a single brake stop in case of system power failure and the like. Thus, it cannot meet the requirements of multiple levels of automatic driving.

In short, traditional pressure regulating valves for air braking may not meet the requirements of quick, accurate, independent and real-time pressure regulation electro-pneumatic braking system automatic pressure regulating valve and hence the requirements of aided driving and automatic driving. Besides, existing automatic pressure regulating valves applicable to electro-pneumatic braking have the problems of incomplete functionality and poor adaptability. Therefore, such products and inventions may not be well suitable for intelligent braking and cannot meet the requirements of aided driving and automatic driving of vehicles.

SUMMARY

To address the technical problems in the prior art, the present disclosure provides an automatic pressure regulating valve for multiple levels of driving automation of a commercial vehicle and a control method thereof. The automatic pressure regulating valve is applicable to an electro-pneumatic braking system of a commercial vehicle allowing for multiple levels of driving automation and can be used in an air braking system of the commercial vehicle allowing for multiple levels of driving automation including manually controlled braking, electronically controlled braking, switching from electronically controlled braking to manually controlled braking, and switching from manual control to electronically controlled braking. The automatic pressure regulating valve can realize quick, accurate, independent and real-time automatic regulation of the pressure of the brake chamber, shorten the transmission time delay of the air braking system, improve the reliability of the air braking system, and still guarantee the manually controlled braking and maintain normal driving of the vehicle in case of failures such as system power failure. Thus, the safety of the vehicle can be improved. The automatic pressure regulating valve is of great significance for aided driving and automatic driving.

To solve the above technical problems, the present disclosure adopts the following technical solutions.

An automatic pressure regulating valve for multiple levels of driving automation of a commercial vehicle includes an upper valve body, a lower valve body, a piston, a main valve core assembly, a switching valve. The switching valve, the quick-acting intake valve and the quick-acting exhaust valve are all mounted at an upper end of the upper valve body. The piston is located in a chamber formed by the upper valve body and the lower valve body to divide the chamber into an upper control chamber and a lower chamber. The main valve core assembly is mounted in the lower valve body.

In the above technical solution, in case of failures such as system power failure occurring in the automatic pressure regulating valve, the switching valve, the quick-acting intake valve and the quick-acting exhaust valve are de-energized to be in a normally open state, the normally open state and a normally closed state, respectively, thereby allowing for conventional braking by manual control.

In the above technical solution, the switching valve is a two-position three-way electromagnetic valve capable of quickly moving to and fro, includes a normally open air inlet b which is a manually controlled air inlet in communication with a pedal valve and a normally closed air inlet a which is an electro-pneumatic inlet in communication with an electronically controlled braking air tank, and is configured to switch between two braking modes, namely, manually controlled braking and electronically controlled braking. The switching valve causes the pedal valve to be communicated with an air inlet d of the quick-acting intake valve in case of failures such as de-energization and system power failure.

In the above technical solution, the quick-acting intake valve is a normally open two-position three-way electromagnetic valve. In case of failures such as de-energization and system power failure, the air inlet d and an air outlet e of the quick-acting intake valve are communicated with each other. The air inlet d of the quick-acting intake valve is connected to an air outlet c of the switching valve. The air outlet of the quick-acting intake valve is connected to the control chamber A of the upper valve body. The quick-acting exhaust valve is a normally closed two-position three-way electromagnetic valve. In case of failures such as de-energization and system power failure, an air inlet f and an air outlet g of the quick-acting exhaust valve are not communicated with each other. The air inlet of the quick-acting exhaust valve is connected to the control chamber A of the upper valve body, while the air outlet is connected to the atmosphere and provided with a muffler. The quick-acting intake valve and the quick-acting exhaust valve are utilized to control air intake and exhaust to regulate a pressure of the control chamber, thereby regulating a braking pressure. The automatic pressure regulating valve is thus capable of guaranteeing normal operation of manually controlled braking even in case of failures such as system power failure.

In the above technical solution, a pressure detection hole k is formed at an air outlet of the lower valve body, and a pressure sensor is disposed in the pressure detection hole k to measure a pressure of an air outlet of the automatic pressure regulating valve in real time, thereby realizing real-time control on the braking pressure.

In the above technical solution, the main valve core assembly includes a main valve core return spring and a main valve core. The piston vertically moves to and fro under the combined action of the pressure of the control chamber, the pressure of the lower chamber and the main valve core return spring to control a vertical displacement of the main valve core, thereby realizing control on the area of the air inlet and finally realizing regulation of the pressure of the brake chamber.

The present disclosure also provides a control method of an automatic pressure regulating valve for multiple levels of driving automation of a commercial vehicle, using the automatic pressure regulating valve for multiple levels of driving automation of a commercial vehicle to automatically regulate a braking pressure as desired by braking and hence realize automatic braking, including the following steps:

(1) setting, by the electro-pneumatic braking system, a target braking pressure $P_1$ of a brake chamber, and inputting the target braking pressure $P_1$ to a controller;
(2) driving, by the controller, the switching valve to act, causing the air outlet c of the switching valve to be communicated with the air inlet d of the quick-acting intake valve, and controlling the quick-acting intake valve and the quick-acting exhaust valve to work, throwing the automatic pressure regulating valve for electro-pneumatic braking of the vehicle into an electronically controlled working mode;
(3) detecting, by the pressure sensor, an outlet pressure $P_2$ of the automatic pressure regulating valve for electro-pneumatic braking of the vehicle, and inputting the outlet pressure $P_2$ to the controller for comparison with the target braking pressure $P_1$;
(4) when $P_2$ is not higher than $P_1$, controlling, by the controller, the quick-acting intake valve and the quick-acting exhaust valve to work synergistically to regulate the pressure, increasing the pressure of the control chamber A, and thereby increasing the displacement of the main valve core and increasing the area of the air inlet, causing the outlet pressure $P_2$ to rise;
(5) when $P_2$ is higher than $P_1$, controlling, by the controller, the quick-acting intake valve and the quick-acting exhaust valve to work synergistically to regulate the pressure, reducing the pressure of the control chamber A such that the displacement of the main valve core is reduced and the main valve core then returns to an initial position, and causing the exhaust port to be communicated with the atmosphere, allowing the outlet pressure to $P_2$ drop; and
(6) controlling, by the controller, the quick-acting intake valve and the quick-acting exhaust valve to act rapidly and repeatedly, and regulating the automatic pressure regulating valve for electro-pneumatic braking of the vehicle, allowing the outlet pressure $P_2$ of the automatic pressure regulating valve to be infinitely close to the target braking pressure $P_1$.

Further, in the present disclosure, manually controlling the braking pressure as desired by braking to realize manual braking may specifically include the following steps:

(7) when a driver wants to brake the vehicle completely independently, requiring active monitoring of the surroundings and the vehicle condition, stepping on the brake pedal for braking, and regulating the braking pressure of the brake chamber;
(8) causing the automatic pressure regulating valve to be de-energized at this time, with the switching valve situated in a position such that the air inlet b and the air outlet c are communicated with each other; causing the quick-acting intake valve to be in the normally open state and in a position such that the air inlet d and the air outlet c are communicated with each other; causing the quick-acting exhaust valve to be in the normally closed state and not communicated with the atmosphere;
(9) when the driver steps on the brake pedal, allowing air to enter the control chamber A through the switching valve and the quick-acting intake valve, and causing the piston and the main valve core to move such that an air inlet h and an air outlet i of the lower valve body are communicated with each other, thereby completing pressure boosting of the brake chamber; and
(10) when the driver releases the brake pedal, causing air in the control chamber to pass through the quick-acting intake valve and the switching valve to be vented to the atmosphere through the pedal valve, and venting air in the lower chamber to the atmosphere through the exhaust port j of the lower valve body.

Further, in the present disclosure, rapidly switching a pressure control mode as desired by braking to realize aided braking may specifically include the following steps:

(11) in conventional electronically controlled aided braking of the vehicle, determining, by the electro-pneumatic braking system, the control model of the automatic pressure regulating valve according to the driving condition of the vehicle and the operation of the driver on the brake pedal;

(12) when the driver steps on the brake pedal, determining, by the controller, whether to switch to the manually controlled braking mode according to received information such as pedal travel, stepping pressure and time, and if yes, performing braking according to steps (7), (8), (9) and (10);

(13) when the driver is distracted or insufficiently steps on the brake pedal in manually controlled braking and the vehicle detects that the braking pressure is insufficient under the surrounding and driving conditions, switching, by the switching valve, to the electronically controlled braking mode to guarantee the vehicle safety, and performing braking according to steps (1), (2), (3), (4), (5) and (6); and (14) in case of failures such as system power failure, causing the switching valve, the quick-acting intake valve and the quick-acting exhaust valve all to be de-energized, switching, by the switching valve, to the manual control mode, and performing braking according to steps (7), (8), (9) and (10).

To sum up, the present disclosure provides a novel automatic pressure regulating valve for an electro-pneumatic braking system of a commercial vehicle suitable for multiple levels of driving automation and a control method thereof. The automatic pressure regulating valve includes the upper valve body, the lower valve body, the switching valve, the quick-acting intake valve, and the quick-acting exhaust valve. The switching valve has two air inlets a, b connected to the electronically controlled braking air tank and the pedal valve in the electro-pneumatic braking system, respectively, and the air outlet c connected to an air inlet d of the quick-acting intake valve. The air outlet e of the quick-acting intake valve and the air inlet f of the quick-acting exhaust valve are connected together to the control chamber A in the upper valve body. The air outlet g of the quick-acting exhaust valve is connected to the atmosphere.

In terms of functionality, the switching valve can switch the braking mode between the manually controlled braking mode and the electronically controlled braking mode. The quick-acting intake valve and the quick-acting exhaust valve are controlled by electronic control signals to realize accurate, quick and real-time regulation of the pressure of the control chamber. In case of power failure, the switching valve is communicated with the pedal valve all the time to ensure normal operation of the braking system. The lower valve body has the air inlet h connected to a service braking air tank, the air outlet i connected to the brake chamber of the air braking system, and the exhaust port j connected to the atmosphere. In the pressure regulating process of the automatic pressure regulating valve, the piston moves down under the action of the pressure of the control chamber to change the pressure of the brake chamber. The controller receives the target pressure, detects the outlet pressure signal by using the pressure sensor, and regulates the pressure of the control chamber through a specific algorithm, thereby realizing accurate, quick and real-time regulation of the pressure of the brake chamber.

The automatic pressure regulating valve is applicable to autonomous vehicles and manually driven vehicles at various levels. The automatic pressure regulating valve can support multiple automatic driving levels and still can guarantee the safety by manual control in case of a disabled electronic control. The automatic pressure regulating valve can be controlled electronically and manually and can also allow online switching between two control modes. The response delay of the air braking system can be reduced, and quick, accurate and real-time regulation of the pressure of the brake chamber can be realized, thereby improving the safety and comfort of vehicle braking. Meanwhile, normal driving of the vehicle can also be guaranteed in case of failures such as system power failure, thereby ensuring the safety of the vehicle.

Compared with the prior art, the present disclosure has the following beneficial effects:

(1) The present disclosure is applied to an electro-pneumatic braking system of a commercial vehicle to realize intelligent braking and can shorten the air pressure transmission pipeline and reduce the transmission time delay of the air braking system.

(2) The present disclosure utilizes the quick-acting switching valve to control the pressure of the control chamber and can realize independent and automatic regulation of the pressure of the brake chamber and realize real-time regulation by pressure feedback regulation.

(3) The present disclosure can stably realize the service braking function of the traditional air braking system even in case of power failure of the electronically controlled system of the vehicle, guarantee normal driving of the vehicle and thus guarantee the driving safety of the vehicle.

(4) The present disclosure is applicable to a commercial vehicle equipped with an automatic driving system and a driver assistance system and maintains the manually controlled control mode with high compatibility.

List of Reference Numerals: 1—upper valve body end cover, 2—upper valve body part, 3—piston, 4—piston sealing ring, 5—valve body sealing ring, 6—lower valve body part, 7—spring seat, 8—spring seat sealing ring, 9—stop collar, 10—rubber muffler, 11—lower main valve core sealing ring, 12—spring collar, 13—main valve core return spring, 14—middle main valve core sealing ring, 15—main valve core, 16—upper main valve core sealing ring, 17—switching valve, 18—quick-acting intake valve, 19—quick-acting exhaust valve, 20—muffler, 21—controller, 22—upper yoke, 23—coil bobbin, 24—end cover sealing ring, 25—coil, 26—outer yoke, 27—lower yoke, 28—iron core, 29—valve sleeve, 30—lower valve sleeve sealing ring, 31—electromagnetic valve return spring, 32—lower valve core sealing ring, 33—middle valve core sealing ring, 34—valve core, 35—upper valve sleeve sealing ring, 36—upper valve core sealing ring, 37—lift pin, 38—armature, a—air inlet 1 of switching valve, b—air inlet 2 of switching valve, c—air outlet of switching valve, d—air inlet of quick-acting intake valve, e—air outlet of quick-acting intake valve, f—exhaust port of quick-acting exhaust valve, g—air outlet of quick-acting exhaust valve, h—air inlet of lower valve body, i—air outlet of lower valve body, j—exhaust port of lower valve body, k—pressure detection hole, l—controller power interface, m—controller signal interface, and A—control chamber.

DETAILED DESCRIPTION OF THE EMBODIMENTS

As shown in FIG. 1 to FIG. 8, there is provided an automatic pressure regulating valve for an electro-pneumatic braking system of a commercial vehicle for multiple levels of driving automation implemented according to the present disclosure. The automatic pressure regulating valve includes an upper valve body, a lower valve body, a piston 3, a main valve core assembly, a switching valve 17, a quick-acting intake valve 18, and a quick-acting exhaust valve 19. The upper valve body includes an upper valve body part 2 and an upper valve body end cover 1. The mutual connection relationships of the upper valve body part are as shown in FIG. 3 to FIG. 6. The switching valve 17 has two air inlets a, b connected to an electronically controlled braking air tank and a pedal valve in the electro-pneumatic braking system, respectively, and an air outlet c connected to an air inlet d of the quick-acting intake valve 18. An air outlet e of the quick-acting intake valve 18 and an air inlet f of the quick-acting exhaust valve 19 are connected together to a control chamber A in the upper valve body. An air outlet g of the quick-acting exhaust valve 19 is connected to the atmosphere through a muffler 20.

Figure 1:
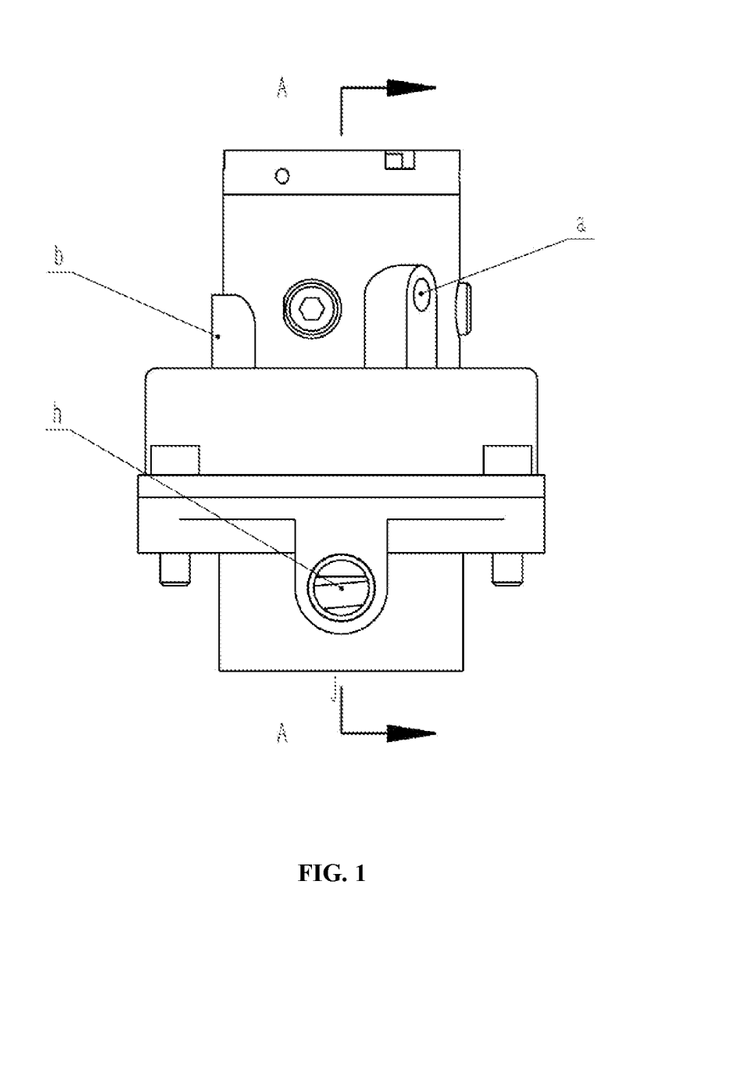
FIG. 1 is a schematic diagram of an outline structure according to the present disclosure.
Figure 2:
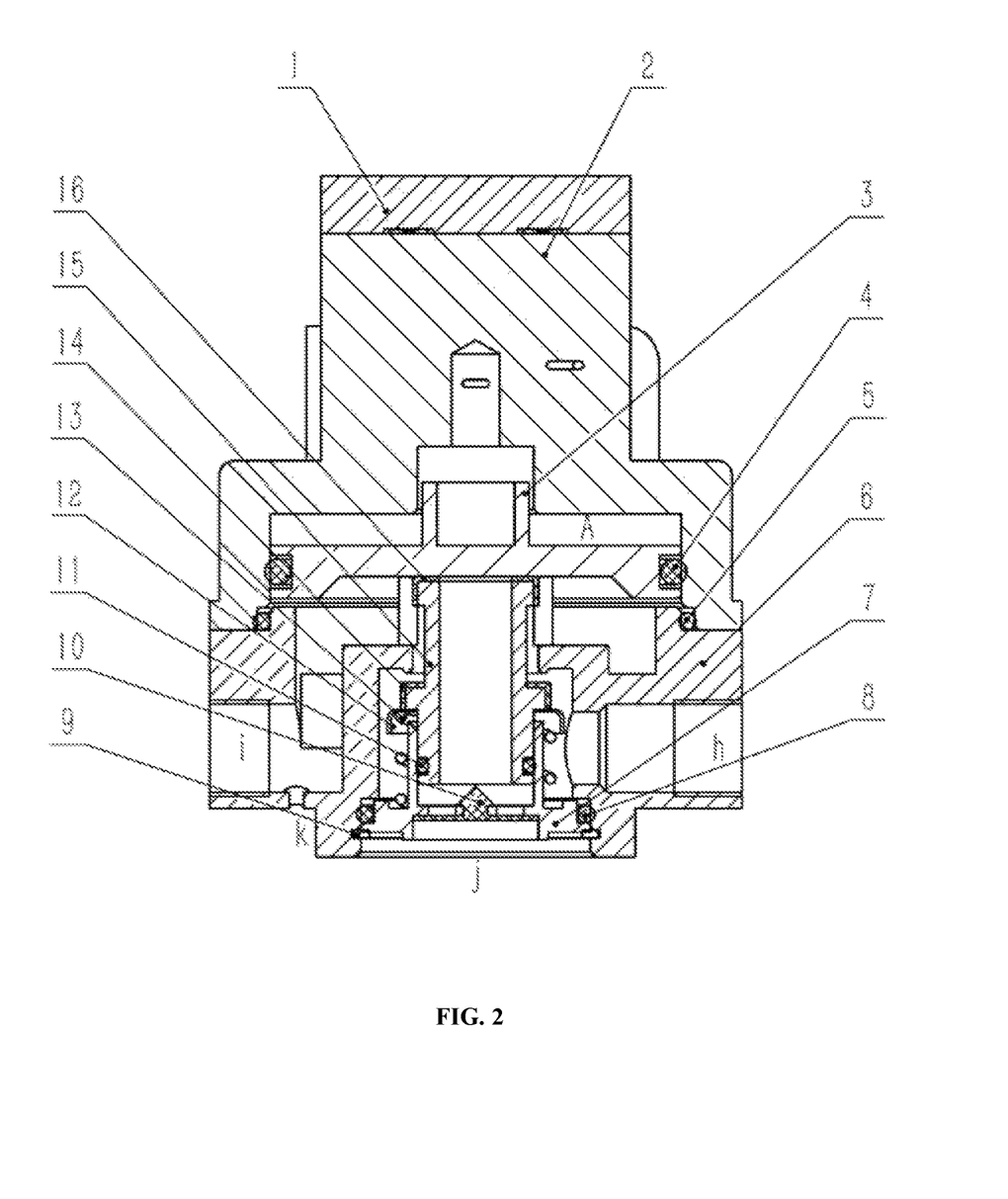
FIG. 2 is a sectional view taken along line A-A in FIG. 1.
Figure 3:
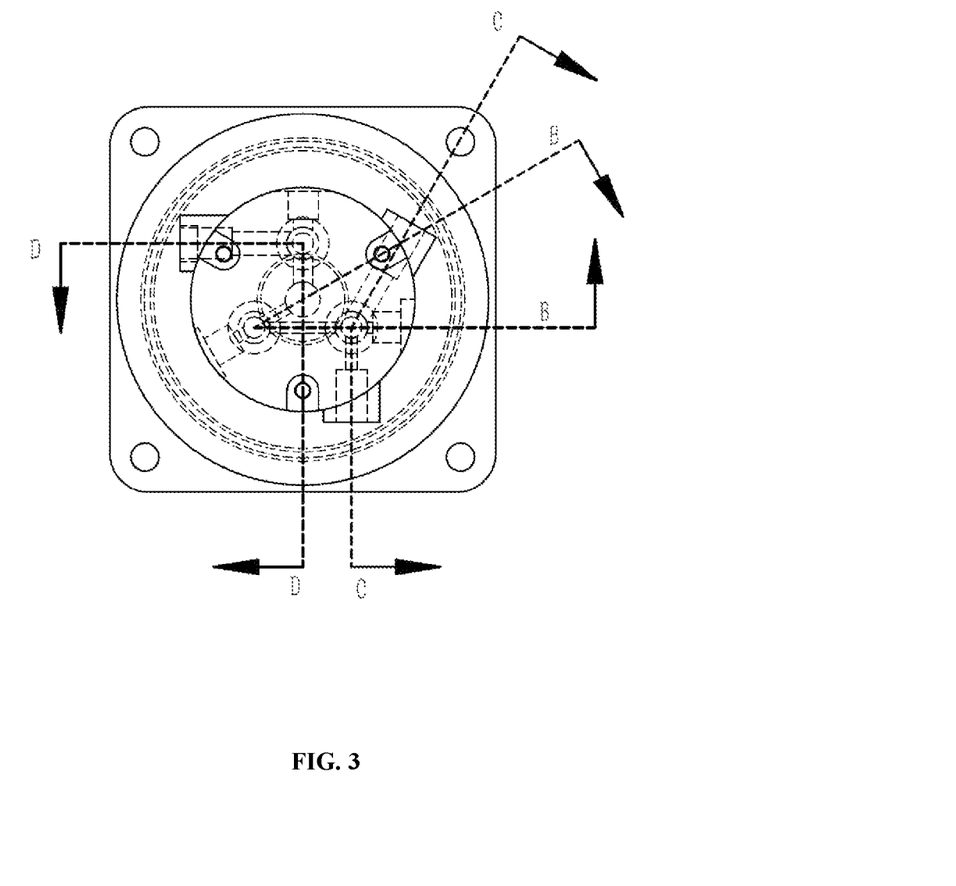
FIG. 3 is a top view according to the present disclosure with a lower valve body removed.
Figure 4:
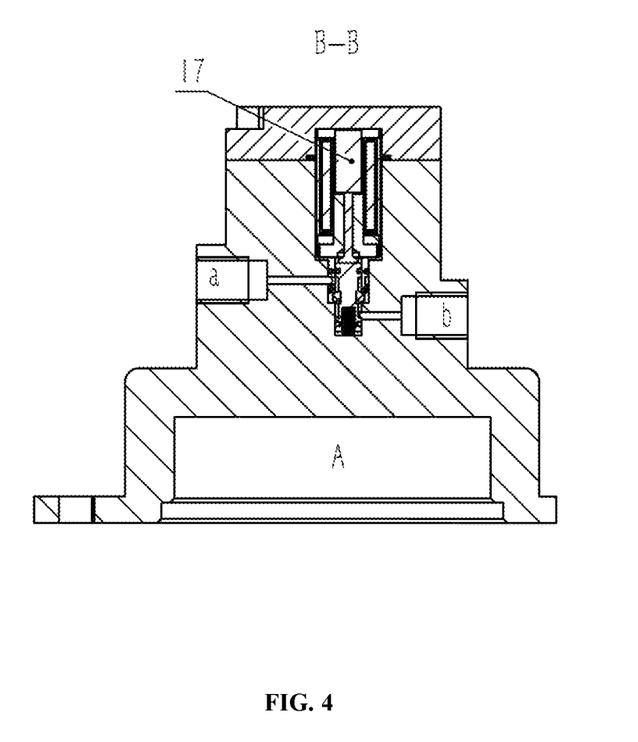
FIG. 4 is a sectional view taken along line B-B of FIG. 3.
Figure 5:
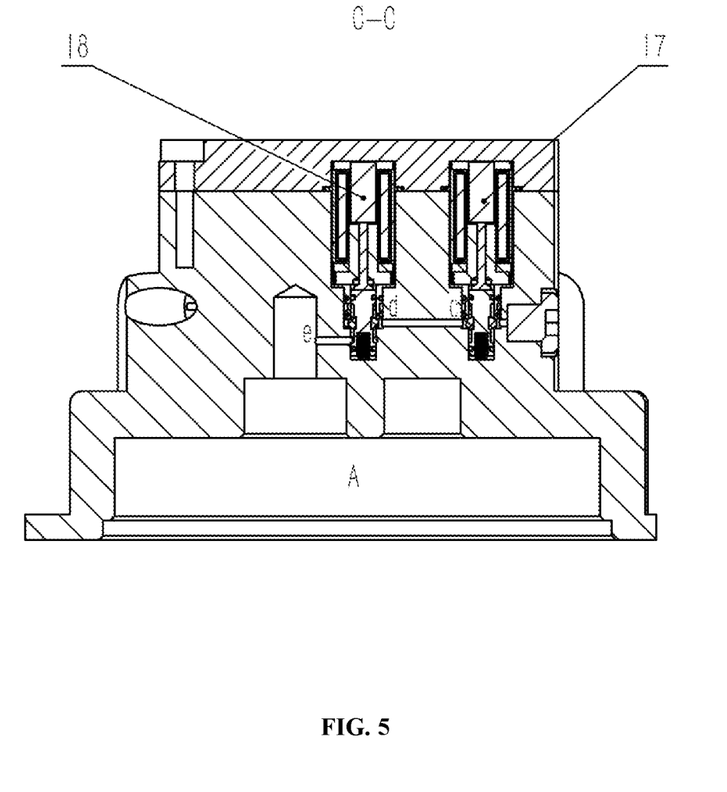
FIG. 5 is a sectional view taken along line C-C in FIG. 3.
Figure 6:
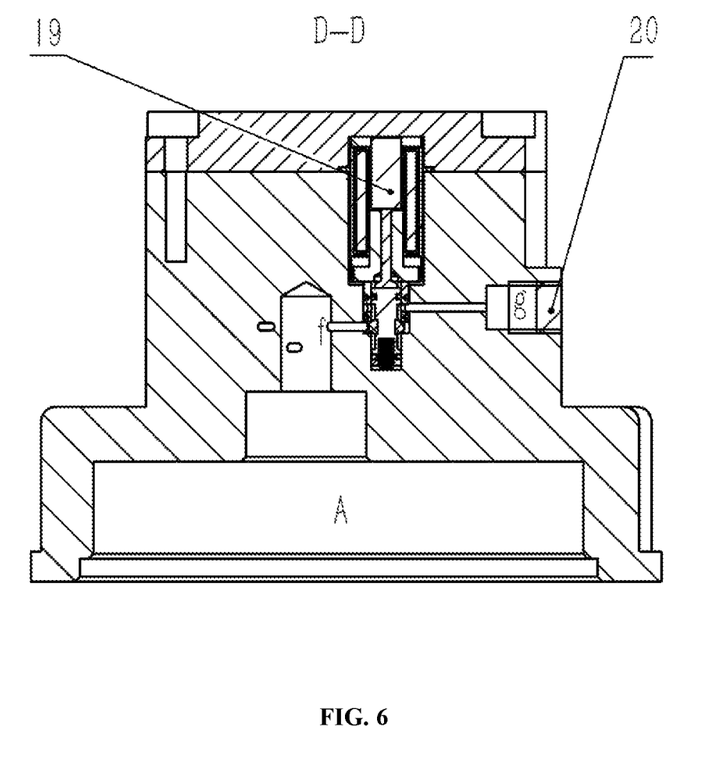
FIG. 6 is a sectional view taken along line C-C in FIG. 3.
Figure 7:
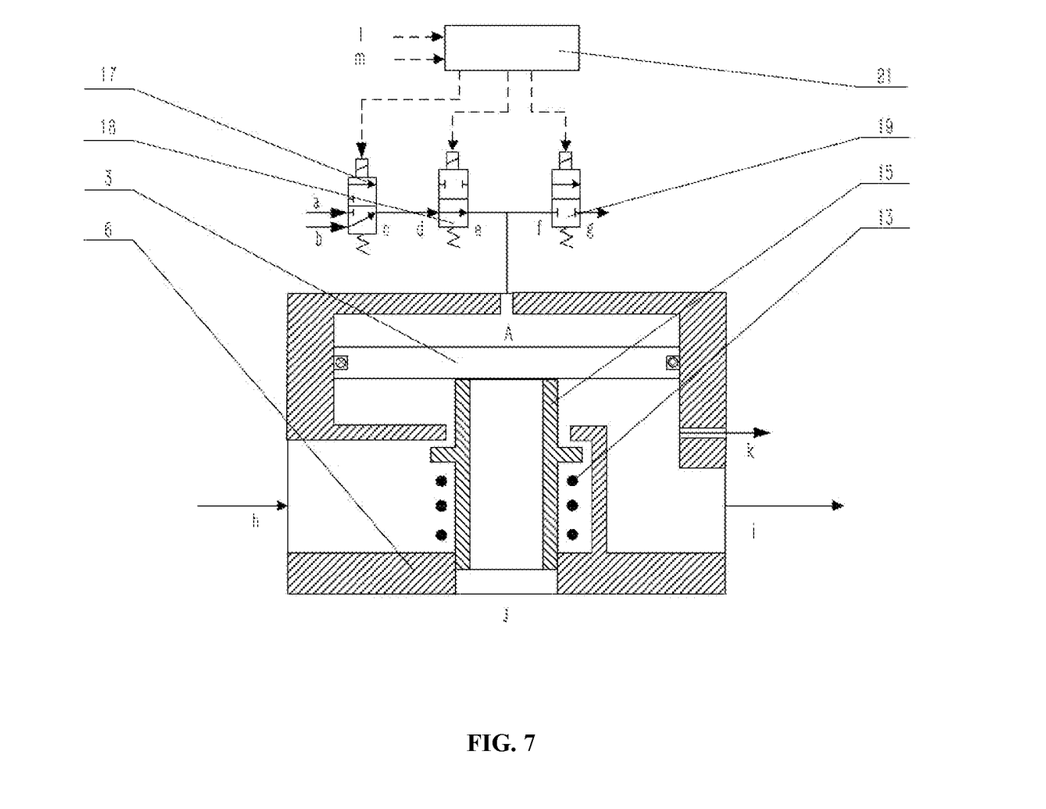
FIG. 7 is a schematic diagram of a system according to the present disclosure.
Figure 8:
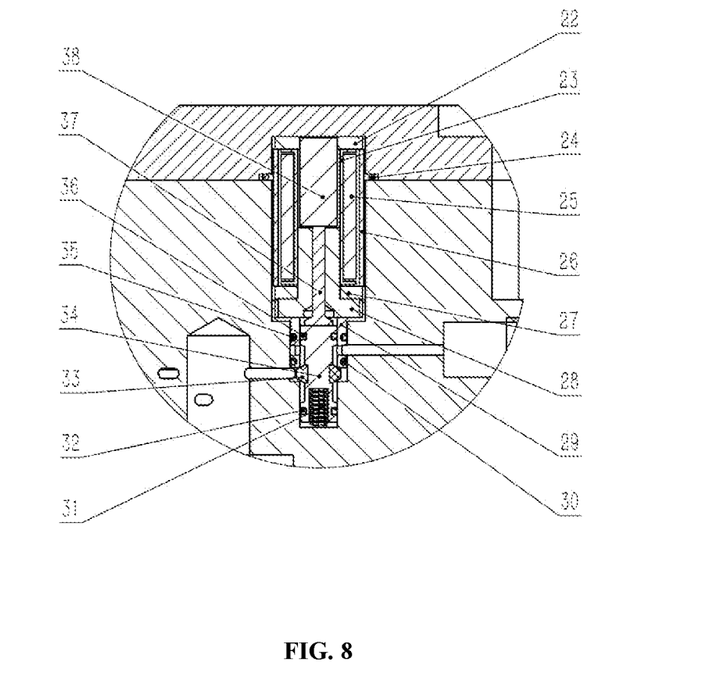
FIG. 8 is a partially enlarged view of FIG. 6.

The switching valve 17, the quick-acting intake valve 18 and the quick-acting exhaust valve 19 in the upper valve body are all two-position three-way electromagnetic valves which have the same structure. The structure of the quick-acting exhaust valve 19 is as shown in FIG. 7. The quick-acting exhaust valve 19 includes an upper yoke 22 disposed in the upper valve body part 2, an end cover sealing ring 24 and an outer yoke 26 disposed in the upper valve body end cover 1 and the upper valve body part 2, a valve sleeve 29 disposed in the upper valve body part 2, and a coil 25 and a coil bobbin 23 disposed in the outer yoke 26. The coil 25 is wound around the coil bobbin 23 and has a thermal led out through a wiring hole in the outer yoke 26. The armature 38 is located in central holes of the upper yoke 22 and the coil bobbin 23. An iron core 28 is located in central holes of the coil bobbin 23, a lower yoke 27 and the valve sleeve 29, and a lift pin 37 is disposed in a central hole of the iron core 28. A valve core 34 is located in the central hole of the valve sleeve 29 and situated below the lift pin 37. An electromagnetic valve return spring 31 is disposed in a central hole of the valve core 34. An upper valve core sealing ring 36 is disposed between the valve core 34 and the valve sleeve 29, and a lower valve core sealing ring 32 is disposed in the valve core 34 and the upper valve body part 2. A middle valve core sealing ring 33 is located between the valve sleeve 29 and the valve core 34, and the upper valve body part 2. An upper valve sleeve sealing ring 35 and a lower valve sleeve sealing ring 30 are disposed between the valve sleeve 34 and the upper valve body part 2. Among the electromagnetic valve parts, only the upper yoke 22, the outer yoke 26, the lower yoke 27, the iron core 28 and the armature 38 are made of a ferromagnetic material.

When the switching valve 17 in the upper valve body is de-energized, the valve core 34 is situated at top dead center under the action of the spring force of the electromagnetic valve return spring 31 and the middle valve core sealing ring 33 comes into contact with the valve sleeve 29 such that the air inlet 1a of the switching valve is disconnected from the air outlet c of the switching valve while the air inlet 2b of the switching valve is communicated with the air outlet c of the switching valve. When the switching valve 18 in the upper valve body is energized, the valve core 34 moves to a bottom dead center under the action of the electromagnetic force and the middle valve core sealing ring 33 comes into contact with the upper valve body part 2 such that the air inlet 1a of the switching valve is communicated with the air outlet c of the switching valve while the air inlet 2b of the switching valve is disconnected from the air outlet c of the switching valve. The other two electromagnetic valves follow the same working principle with the switching valve 17.

A piston 3 capable of moving longitudinally is disposed in the upper valve body part 2. A main valve core 15, a main valve core 13, a spring seat 7 and a stop collar 9 are disposed in a lower valve body part 6. A piston sealing ring 4 is disposed between the piston 3 and the upper valve body part 2. An upper main valve core sealing ring 16 is disposed between the piston 3 and the main valve core 15. A valve body sealing ring 5 is disposed between the upper valve body part 2 and the lower valve body part 6. A middle main valve core sealing ring 14 is disposed between the main valve core 15 and the lower valve body part 6. A lower valve core sealing ring 11 is disposed between the spring seat 7 and the lower valve body part 6.

When the automatic pressure regulating valve is in the manually controlled braking state, the three valves in the upper valve body are all de-energized. Among them, the switching valve 17 causes the air inlet d of the quick-acting intake valve to be communicated with a pedal valve controlled by a driver, the quick-acting intake valve 18 to be opened and the quick-acting exhaust valve 19 to be closed. The pressure in the control chamber A is consistent with the output pressure of the pedal valve. When the driver does not manipulate the pedal valve, the piston 3 comes into contact with the upper main valve core sealing ring 16 under the action of its own gravity such that the exhaust valve is closed. The main valve core 15 closes the intake valve under the action of the main valve core return spring 13 such that an air inlet h of the lower valve body is disconnected from an air outlet i of the lower valve body and the air outlet i of the lower valve body is disconnected from an exhaust port j of the lower valve body. When the driver steps on the pedal valve, air from the pedal valve enters the control chamber A through the switching valve 17 and the quick-acting intake valve 18, causing the pressure in the control chamber A to rise. The piston 3 moves down to overcome the acting force of the main valve core return spring 13 so that the intake valve can thus be opened. At this time, the exhaust valve is closed, and the air inlet h is communicated with the air outlet i while the air outlet i is disconnected from the exhaust port j. When the driver releases the pedal valve, air from the control chamber A is vented to the atmosphere through the pedal valve, resulting in reduced pressure in the chamber. The piston 3 moves upwards and the upper main valve core sealing ring 16 is separated from the piston 3 such that the exhaust valve is opened while the intake valve is closed. The air inlet h is then disconnected from the air outlet i and the air outlet i is communicated with the exhaust port j such that the air in the brake chamber is vented through the exhaust valve to relieve the pressure.

When specifically implemented, the automatic pressure regulating valve for an electro-pneumatic braking system of a commercial vehicle can meet the requirements of air braking systems of commercial vehicles at different levels of driving automation. for example, regardless of purely electronically controlled braking or electronically controlled aided braking oriented to automatic driving, the braking pressure of the brake chamber can be regulated quickly and accurately based on a given target pressure. Accordingly, different embodiments can be provided. Moreover, the automatic pressure regulating valve is also applicable to the manually controlled braking mode.

An embodiment of the automatic pressure regulating valve for an electro-pneumatic braking system of a commercial vehicle at the pressure regulation requirement of purely electronically controlled braking of automatic driving is described below.

In the normal driving process of the vehicle, if the road condition or the vehicle motion condition changes, the braking system calculates a target pressure $P_1$ of each brake chamber by means of an overall vehicle dynamic model and inputs the target pressure $P_1$ of each brake chamber to a corresponding controller 21. The controller 21 then controls the switching valve 17 to work such that the electronically controlled braking air storage tank is communicated with the control chamber A, causing the pressure in the control chamber A to rise. The piston 3 is pushed by the pressure of the control chamber A to move down. The piston 3 moves down and pushes the main valve core 15 to move down. In the process of the main valve core 15 moving down, the intake valve is opened. At this time, the air inlet h is communicated with the air outlet i such that compressed air from the air inlet h reaches the air outlet i through the intake valve and finally enters the brake chamber, causing the pressure in the brake chamber to rise. A pressure detection hole k disposed at the air outlet i is connected to a pressure sensor which acquires in real time and feeds back the output pressure to the controller 21. The controller 21 then compares the output pressure $P_2$ with the target pressure $P_1$. When it is detected that the output pressure $P_2$ reaches the target pressure $P_1$, the controller 21 controls the quick-acting intake valve 18 to be energized to be closed. At this time, the intake valve and the exhaust valve are closed, and the pressure of the brake chamber remains stable. When it is detected that the output pressure $P_2$ is higher than the target pressure $P_1$, the controller 21 controls the quick-acting intake valve 18 to be energized to be closed and the quick-acting exhaust valve 19 to be energized to be opened such that the compressed air in the control chamber A is vented through the exhaust port g of the quick-acting exhaust valve and the pressure drops. The drop of the pressure in the control chamber A causes the piston 3 and the main valve core 15 to move upwards together, during which the intake valve is closed under the action of the return spring. The piston 3 continues to move upwards to separate from the upper main valve core sealing ring 16 on the main valve core 15 such that the exhaust valve is opened. At this time, the air outlet i is communicated with the exhaust port j and the compressed air from the air outlet i is vented to the atmosphere through the exhaust valve, causing the braking pressure of the brake chamber to drop. When the output pressure $P_2$ drops to the target pressure $P_1$, the controller 21 controls the quick-acting intake valve 18 to be energized to be closed, the quick-acting exhaust valve 19 to be de-energized to be closed, and the intake valve and the exhaust valve of the lower valve body to be closed such that the pressure of the brake chamber remains stable. When it is detected that the output pressure $P_2$ is lower than the target pressure $P_1$, the controller 21 controls the quick-acting intake valve 18 to be opened and the quick-acting exhaust valve 19 to be de-energized to be closed, causing the pressure of the control chamber A to rise. Thus, the intake valve is driven to be opened such that the output pressure rises. When the output pressure $P_2$ reaches the target pressure $P_1$, the quick-acting intake valve 18 is energized to be closed, and the intake valve and the exhaust valve are closed, causing the pressure of the brake chamber to remain stable. The above process is repeated so that the output pressure $P_2$ can be regulated to be equal to the target pressure $P_1$.

An embodiment of the automatic pressure regulating valve for an electro-pneumatic braking system of a commercial vehicle in case of electronically controlled aided braking is described below. In the normal braking process of the vehicle, the braking system calculates a desired braking pressure $P_1$ of the brake chamber based on the overall vehicle dynamic model and pedal travel. When the driver steps on the brake pedal, the automatic pressure regulating valve outputs pressure $P_3$, and the braking system compares the desired braking pressure $P_1$ with the actual pressure $P_3$. When it is detected that the output pressure $P_3$ reaches the target pressure $P_1$, the controller 21 controls the switching valve 17 to be de-energized to be opened and the quick-acting intake valve 18 to be energized to be closed. At this time, the intake valve and the exhaust valve are closed, and the pressure of the brake chamber remains stable. When it is detected that the output pressure $P_3$ is higher than the target pressure $P_1$, the controller 21 controls the quick-acting intake valve 18 to be energized to be closed and the quick-acting exhaust valve 19 to be energized to be opened such that the compressed air in the control chamber A is vented through the exhaust port g of the quick-acting exhaust valve and the pressure drops. The drop of the pressure in the control chamber A causes the piston 3 and the main valve core 15 to move upwards together, during which the intake valve is closed under the action of the return spring. The piston 3 continues to move upwards to separate from the upper main valve core sealing ring 16 on the main valve core 15 such that the exhaust valve is opened. At this time, the air outlet i is communicated with the exhaust port j and the compressed air from the air outlet i is vented to the atmosphere through the exhaust valve, causing the braking pressure of the brake chamber to drop. When the output pressure $P_3$ drops to the target pressure $P_1$, the controller 21 controls the quick-acting intake valve 18 to be energized to be closed, the quick-acting exhaust valve 19 to be de-energized to be closed, and the intake valve and the exhaust valve of the lower valve body to be closed such that the pressure of the brake chamber remains stable. When it is detected that the output pressure $P_3$ is lower than the target pressure $P_1$, the controller 21 controls the switching valve 17 to be energized, the quick-acting intake valve 18 to be de-energized to be opened and the quick-acting exhaust valve 19 to be de-energized to be closed. At this time, electronically controlled braking is enabled, and the pressure of the control chamber A rises such that the intake valve is driven to be opened to increase the output pressure. When the output pressure $P_3$ reaches the target pressure $P_1$, the controller 21 controls the switching valve 17 to be de-energized, the quick-acting intake valve 18 to be energized to be closed and the quick-acting exhaust valve 19 to be de-energized to be closed, and the intake valve and the exhaust valve are closed, causing the pressure of the brake chamber to remain stable. The above process is repeated so that the output pressure $P_2$ can be regulated to be equal to the target pressure $P_1$. When the vehicle is in need of emergency braking, the controller 21 directly allows the switching valve 17 to be energized, and then compressed air enters the control chamber A through the quick-acting intake valve 18. Accordingly, the pressure in the control chamber A rises to move the piston 3 downwards, thereby moving the main valve core 15 downwards to open the intake valve. Thus, the air inlet h is communicated with the air outlet i to enable boosted pressure braking of the brake chamber. After the completion of the braking process, the controller 21 controls the quick-acting intake valve 18 to be energized to be closed and the quick-acting exhaust valve 19 to be energized to be opened, thereby completely vent the compressed air in the control chamber A. meanwhile, the exhaust valve is opened to completely vent the compressed air in the brake chamber therethrough. Thus, braking is released. The switching valve 17 is de-energized afterwards.

An embodiment of the automatic pressure regulating valve for an electro-pneumatic braking system of a commercial vehicle in case of manually controlled braking is described below. In the normal braking process of the vehicle, the automatic pressure regulating valve is de-energized, and the switching valve 17 is in the normally open state, while the quick-acting intake valve 18 in the normally open state and the quick-acting exhaust valve 19 in the normally closed state. After the driver steps on the brake pedal, compressed air passes through the manually controlled braking air inlet b of the switching valve 17 and enters the control chamber A through the quick-acting intake valve 18. Accordingly, the pressure in the control chamber A rises to move the piston 3 downwards, thereby moving the main valve core 15 downwards to open the intake valve. Thus, the air inlet h is communicated with the air outlet i to enable boosted pressure braking of the brake chamber. When the driver releases the brake pedal, the air in the control chamber A passes through the quick-acting intake valve 18 and the switching valve 17, and the air in the brake chamber is vented by the pedal valve. The piston 3 moves upwards as the pressure in the control chamber A drops, such that the air outlet i of the lower valve body is communicated with the exhaust port j of the lower valve body, thereby venting the compressed air in the brake chamber to the atmosphere. The present disclosure is not limited to the foregoing embodiments. On the basis of the technical solution disclosed in the present disclosure, a person skilled in the art can make some replacements and variations to some of the technical features according to the disclosed technical contents without creative effort, and such replacements and variations shall all fall within the protection scope of the present disclosure.

What is claimed is:

1. An automatic pressure regulating valve for multiple levels of driving automation of a commercial vehicle, comprising an upper valve body, a lower valve body, a piston, a main valve core assembly, a switching valve, a quick-acting intake valve, and a quick-acting exhaust valve, wherein the switching valve, the quick-acting intake valve and the quick-acting exhaust valve are all mounted at an upper end of the upper valve body; the piston is located in a chamber formed by the upper valve body and the lower valve body to divide the chamber into an upper control chamber and a lower chamber; and the main valve core assembly is mounted in the lower valve body; and wherein the quick-acting intake valve is a normally open two-position three-way electromagnetic valve; in case of failures such as de-energization and system power failure, the air inlet d and an air outlet e of the quick-acting intake valve are communicated with each other; the air inlet d of the quick-acting intake valve is connected to an air outlet c of the switching valve; the air outlet of the quick-acting intake valve is connected to the control chamber A of the upper valve body; the quick-acting exhaust valve is a normally closed two-position three-way electromagnetic valve; in case of failures such as de-energization and system power failure, an air inlet f and an air outlet g of the quick-acting exhaust valve are not communicated with each other; the air inlet of the quick-acting exhaust valve is connected to the control chamber A of the upper valve body, while the air outlet is connected to the atmosphere and provided with a muffler; the quick-acting intake valve and the quick-acting exhaust valve are utilized to control air intake and exhaust to regulate a pressure of the control chamber, thereby regulating a braking pressure.

2. The automatic pressure regulating valve according to claim 1, wherein in case of failures such as system power failure occurring in the automatic pressure regulating valve, the switching valve, the quick-acting intake valve and the quick-acting exhaust valve are de-energized to be in a open state, the open state and a closed state, respectively, thereby allowing for conventional braking by manual control.

3. The automatic pressure regulating valve according to claim 1, wherein the switching valve is a two-position three-way electromagnetic valve capable of quickly moving to and fro, comprises a open air inlet b which is a controlled air inlet and a closed air inlet a which is an electro-pneumatic inlet, and is configured to switch between two braking modes, namely, manually controlled braking and electronically controlled braking.

4. The automatic pressure regulating valve according to claim 1, wherein a pressure detection hole k is formed at an air outlet of the lower valve body, and a pressure sensor is disposed in the pressure detection hole k to measure a pressure of an air outlet of the automatic pressure regulating valve in real time, thereby realizing real-time control on the braking pressure.

5. The automatic pressure regulating valve according to claim 1, wherein the main valve core assembly comprises a main valve core return spring and a main valve core; the piston vertically moves to and fro under the combined action of the pressure of the control chamber, the pressure of the lower chamber and the main valve core return spring to control a vertical displacement of the main valve core, thereby realizing control on the area of the air inlet.

* * * * *